United States Patent
Varesio et al.

(10) Patent No.: US 11,233,540 B2
(45) Date of Patent: Jan. 25, 2022

(54) APPARATUS AND METHODS FOR G$_3$-PLC BOOTSTRAP IN A HYBRID NETWORK

(71) Applicant: STMicroelectronics S.r.l., Agrate Brianza (IT)

(72) Inventors: Matteo Varesio, Castellamonte (IT); Paolo Treffiletti, Bergamo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 17/210,135

(22) Filed: Mar. 23, 2021

(65) Prior Publication Data

US 2021/0306030 A1    Sep. 30, 2021

(30) Foreign Application Priority Data

Mar. 31, 2020 (IT) .................. 102020000006739

(51) Int. Cl.
*H04B 3/54* (2006.01)

(52) U.S. Cl.
CPC ............. *H04B 3/544* (2013.01); *H04B 3/542* (2013.01); *H04B 2203/5433* (2013.01)

(58) Field of Classification Search
CPC ........... H04B 3/54; H04B 3/544; H04B 3/546
See application file for complete search history.

(56) References Cited

U.S. PATENT DOCUMENTS

| | | |
|---|---|---|
| 2009/0303900 A1 | 12/2009 | Cho et al. |
| 2012/0236758 A1 | 9/2012 | Yonge, III et al. |
| 2013/0094597 A1 | 4/2013 | Vijayasankar et al. |
| 2015/0163134 A1* | 6/2015 | Ananthakrishnan .... H04L 45/34 370/400 |
| 2016/0081005 A1 | 3/2016 | Patil et al. |
| 2016/0150459 A1 | 5/2016 | Patil et al. |
| 2017/0135022 A1 | 5/2017 | Amini et al. |
| 2018/0139679 A1 | 5/2018 | Astrom et al. |
| 2018/0152879 A1 | 5/2018 | Petersen et al. |

(Continued)

OTHER PUBLICATIONS

Kaveh R., et al., "Enhanced 6LoWPAN Ad hoc routing for G3-PLC," Power Line Communications and Its Applications (ISPLC), 2013 17th IEEE International Symposium On, IEEE, Mar. 24, 2013, 6 pages.

(Continued)

*Primary Examiner* — Kevin Kim
(74) *Attorney, Agent, or Firm* — Slater Matsil, LLP

(57) ABSTRACT

An embodiment method implemented by an agent device comprises receiving, by the agent device, from a device, a bootstrap request message over a first communication channel; transmitting, by the agent device, to a coordinating device, a request message comprising the bootstrap request message and a first channel type indicator indicating a channel type of the first communication channel; receiving, by the agent device, from the coordinating device, a response message comprising a bootstrap response message and a second channel type indicator indicating the channel type of the first communication channel; and transmitting, by the agent device, to a device, the bootstrap response message over a second communication channel in accordance with the second channel type indicator.

20 Claims, 5 Drawing Sheets

(56) References Cited

U.S. PATENT DOCUMENTS

2020/0084689 A1    3/2020   Arvidson et al.

OTHER PUBLICATIONS

Texas Instruments, "Hybrid RF and PLC Reference Design to Extend Network Coverage and Reliability," May 2016, 33 pages.
Boillot, M.,"Advanced Smart Grids for Distribution System Operators," p. 109, Wiley Publishing, 2014.
ITU,"ITU-T: G.9903: Series G: Transmission Systems and Media, Digital Systems and Networks: Access networks—In premises networks: Narrowband orthogonal frequency division multiplexing power line communication transceivers for G3-PLC networks", Aug. 2017, 232 pages.
Razazian, K., et al.,"Enhanced 6LoWPAN Ad Hoc Routing for G3-PLC," IEEE 17th International Symposium on Power Line Communications and Its Applications, Mar. 2013, 6 pages.

* cited by examiner

| Row number | LBD Address | LBD Channel |
|---|---|---|
| 0 | 0011223344556677 | PLC |
| 1 | 7766554433221100 | RF |
| 2 | 1122112211221122 | PLC |
| ... | ... | ... |
| N | 0011001100110011 | RF |

US 11,233,540 B2

APPARATUS AND METHODS FOR G₃-PLC BOOTSTRAP IN A HYBRID NETWORK

CROSS-REFERENCE TO RELATED APPLICATIONS

This application claims the benefit of Italian Application No. 102020000006739, filed on Mar. 31, 2020, which application is hereby incorporated herein by reference.

TECHNICAL FIELD

Embodiments of the present invention relate generally to apparatus and methods for g3-plc bootstrap in a hybrid network. In particular, embodiments of the present invention relate to apparatus and procedures for starting devices in a hybrid power line communication network.

BACKGROUND

G3-PLC is a protocol that provides reliable communication on the electrical grid, using power line communication technology. It is hosted by the International Telecommunications Union (ITU) standard organization (ITU-T G.9903) and it is supported by an international association, the G3-PLC Alliance.

Sub-GHz RF is a widely used technology for Smart Grid, Smart City and Smart Home applications.

The G3-PLC technology is extended with Sub-GHz RF to establish a hybrid network.

In PLC networks, and more specifically in G3-PLC networks, as soon as a device (e.g., smart meter) is powered on, it attempts to access the network, communicating with the personal area network (PAN) Coordinator—the central device of the system.

That process is called bootstrap and is shown in FIG. 1 as:
Obtaining security credentials;
Associating with the PAN Coordinator;
Obtaining a 16-bit short address; and
Constructing an IPv6 address.

After bootstrap is completed the device is part of the G3-PLC network. The device can then reach other devices in the network using 16-bit short address, and the routing algorithm is enabled.

Prior to bootstrap completion, the device can communicate only by point-to-point communications using extended unique identifier-164 (EUI64) addressing (routing and media access control (MAC) ciphering are unavailable).

The example in FIG. 2 shows the bootstrap procedure in a G3 network PLC only.

Device A powers on and needs to join the network;
Device A composes Bootstrap messages (LBP) storing its EUI64 address inside;
Device A sends Bootstrap messages to the PAN Coordinator, either directly or through an Agent, in this case Device B is the agent;
The Agent is a device already part of the network, which is able to communicate to the PAN Coordinator;
When the PAN Coordinator replies, it sends the Bootstrap messages to Device B; and
The Device B transmits the message to the final destination (Device A), which picks up its EUI64 address from the message content.

The example in FIG. 3 shows the bootstrap procedure in a G3 hybrid network (PLC and RF).

Device A composes Bootstrap messages (LBP) storing its EUI64 address inside;
Device A sends Bootstrap messages to the PAN Coordinator, either directly or through an Agent, selecting one of the available channels (e.g., PLC or RF);
When the PAN Coordinator replies it sends the Bootstrap messages to Agent—Device B; and
The Device B needs to transmit the message to the final destination (Device A).

The destination address is the EUI64 embedded in the Bootstrap message, as shown in FIG. 3, but the problem exists regarding which channel to use for the transmission to Device A.

Applicant is not aware of previous solutions to solve the above problems.

SUMMARY

Embodiments presented herein are related to communications, in particular to the scenario with different types of media used in the same network, such as power line communication (PLC) channel and radio frequency (RF) wireless channel.

Embodiments generally provide an extension of PLC protocols to support RF channel as additional medium in order to create a hybrid network.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Specific embodiments of the invention are described below.

Figure 1:
FIG. 1 illustrates a device bootstrap process in a G3-PLC network.
Figure 2:
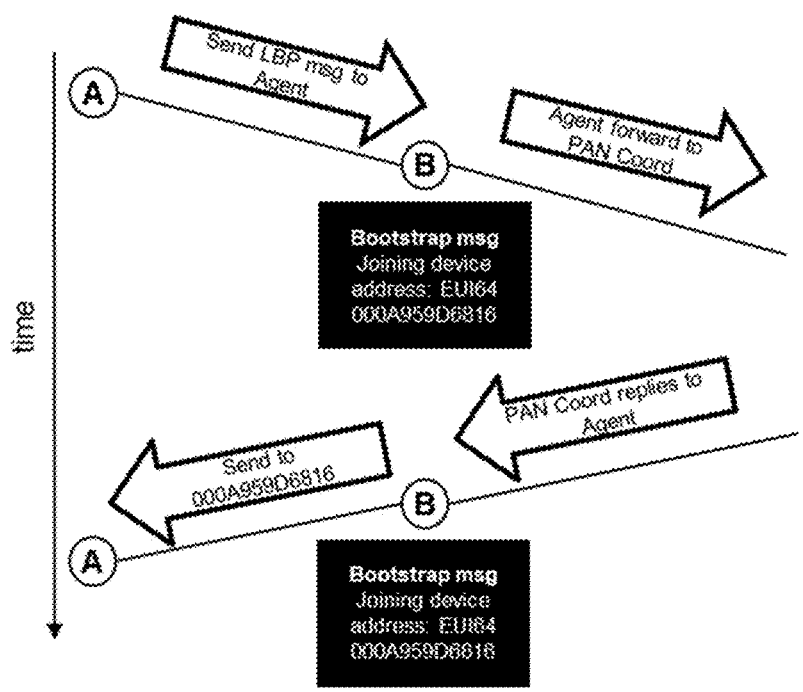
FIG. 2 illustrates a bootstrap procedure in a G3 network with PLC only.
Figure 3:
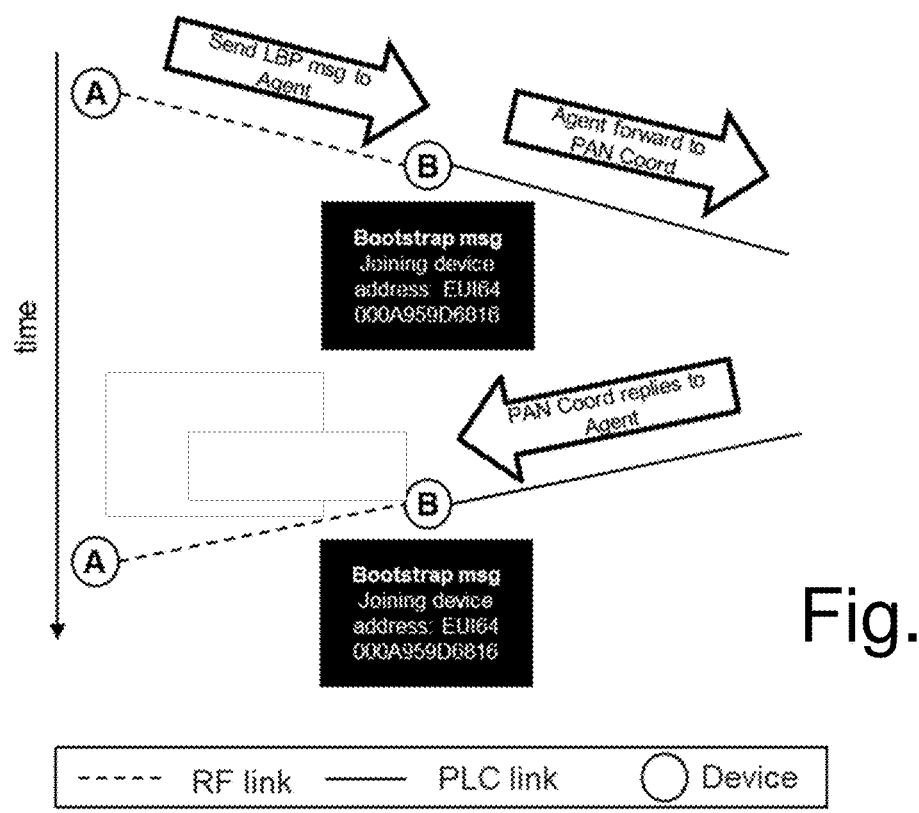
FIG. 3 illustrates a bootstrap procedure in a G3 hybrid network.
Figure 4:
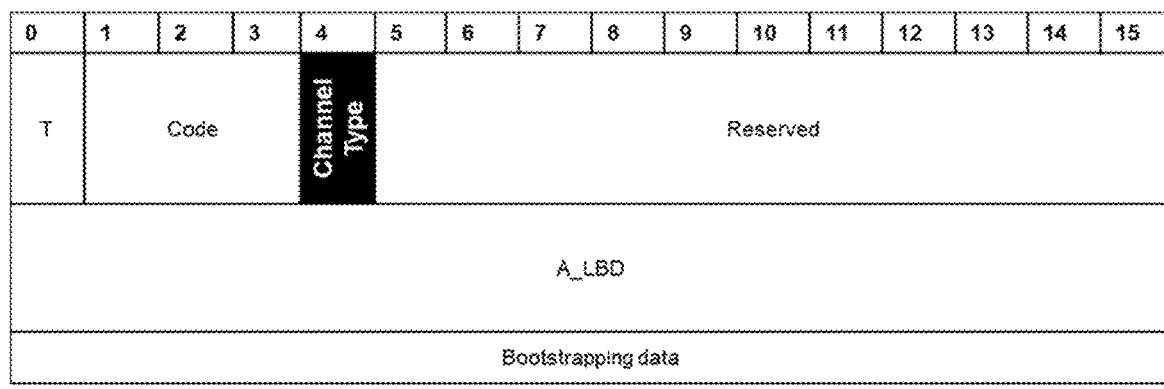
FIG. 4 illustrates an embodiment LBP message.
Figure 5:
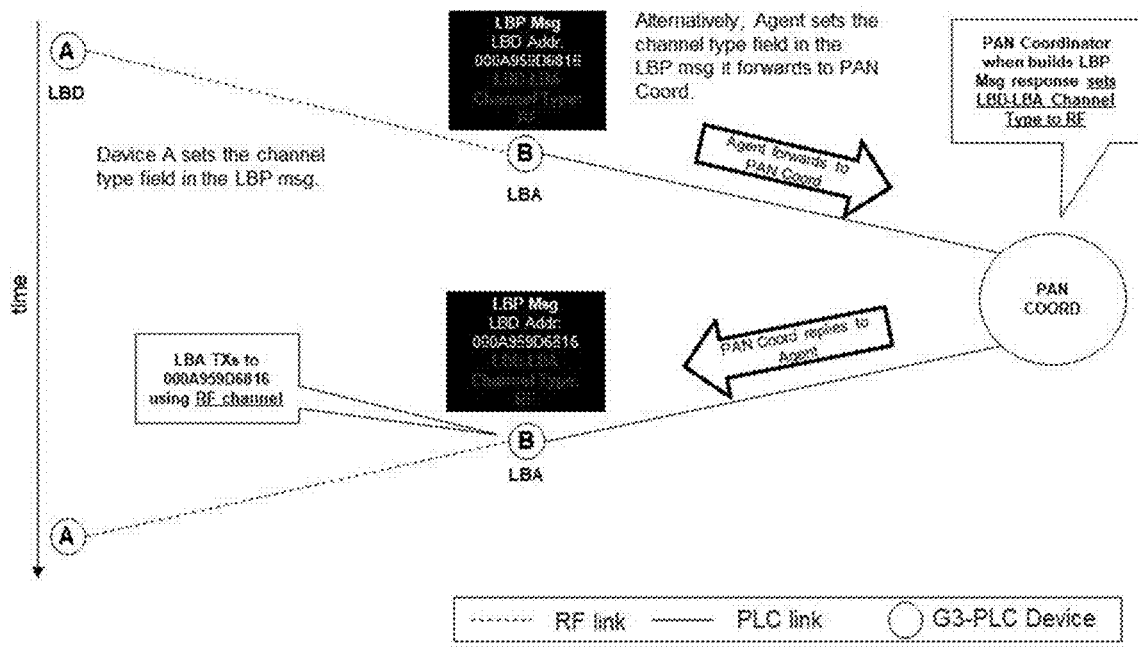
FIG. 5 illustrates LBP communications.

A first embodiment illustrated in FIGS. 4 and 5 defines a new field in leader based protocol (LBP) protocol messages to specify the channel type (or similarly medium type or media type) over which data between the LBD (Bootstrapping Device) and the LBA (Bootstrapping Agent) has to be exchanged. The new field is referred to as the channel type field (or similarly medium type field or media type field) or channel type indicator (or similarly medium type indicator or media type indicator). Although the discussion focuses on channel type, channel type field, and channel type indicator, other names may be used. The use of channel type, channel type field, and channel type indicator should not be construed as being limiting to the scope of the embodiments. The channel type field may be as short as a 1-bit field.

Figure 6:
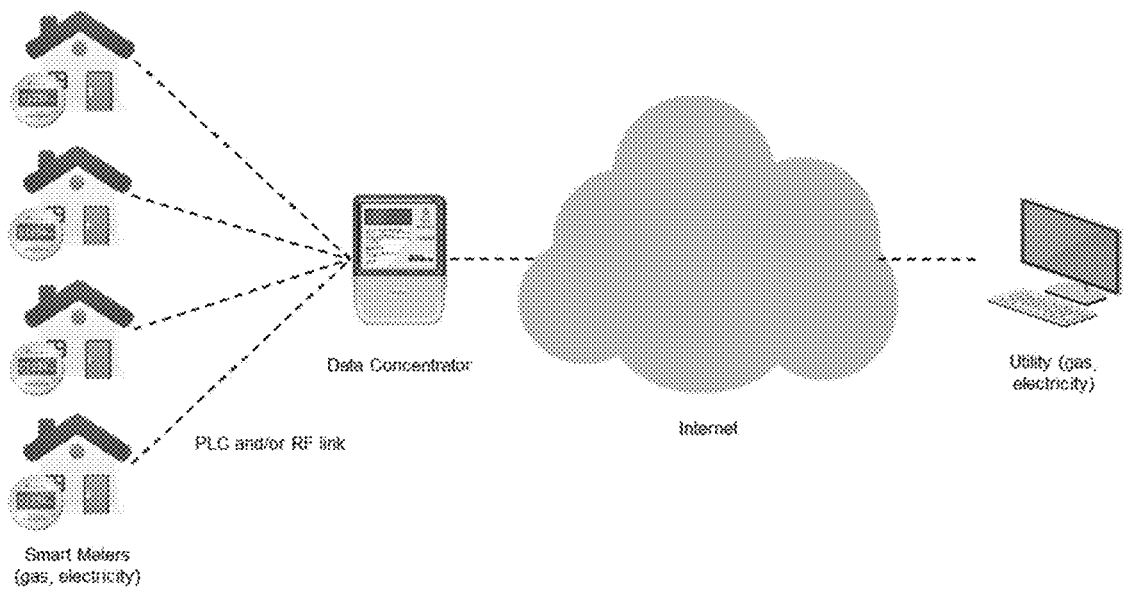
FIG. 6 illustrates a smart metering system architecture.

Smart metering system architecture, in accordance with embodiments of the disclosure, is illustrated in FIG. 6.

Embodiments of the disclosure have many advantages over known solutions such as extending G3-PLC technology to be used in hybrid networks, providing capability to characterize each link even in hybrid networks, and maintaining compatibility with standard G3-PLC implementation.

Embodiments of the disclosure achieve these advantages by modifying the format of some messages in order to carry new information (i.e., in G3-PLC modifying LBP messages).

A second embodiment of the disclosure is discussed next.

Figures 7, 8:
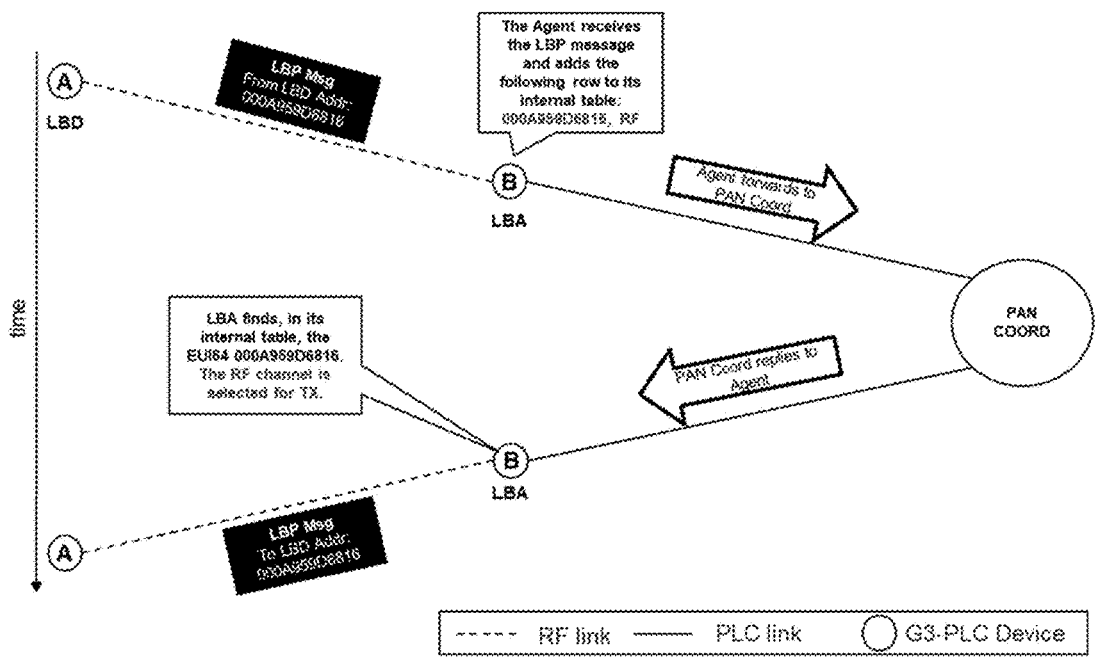
FIG. 7 illustrates an LBD address/channel association table.
FIG. 8 illustrates updating of the table during LBP communications.

In the second embodiment, the Agent maintains a table (see FIGS. 7 and 8) in its internal volatile memory in which, for example, each row corresponds the following associations:

<LBD address>, <LBD channel used to TX>

Where LBD address is the address of the device that is bootstrapping through the Agent, and LBD channel is the channel type, e.g., PLC or RF, use to transmit to the device.

Figure 9:
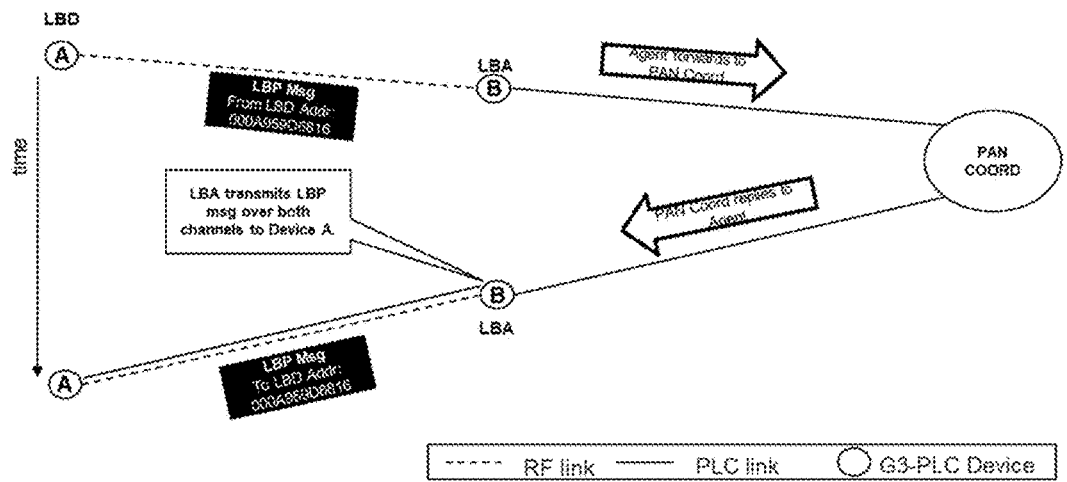
FIG. 9 illustrates an agent transmitting a bootstrap message response over both channels.

A third embodiment of the disclosure is discussed next with reference to FIG. 9.

In the third embodiment, the agent transmits the bootstrap message response over both of the channels (e.g., PLC and RF).

Accordingly, embodiments of the disclosure extend PLC technology to be used in hybrid networks when other media types are used. This allows the device that is registering to the network to use any of the channels.

Figure 10:
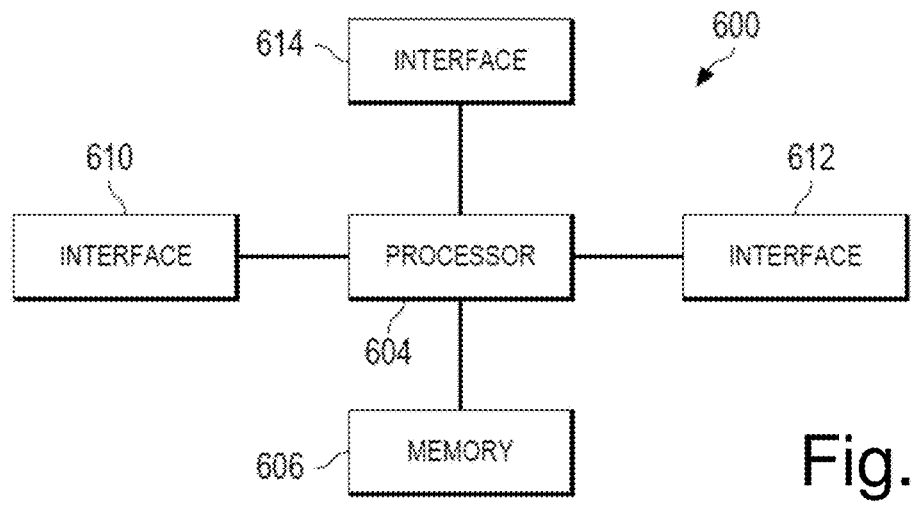
FIG. 10 illustrates an embodiment processing system.

FIG. 10 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in the figure. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in the figure, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, a data concentrator, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), a smart meter, or any other device adapted to access a telecommunications network.

Figure 11:
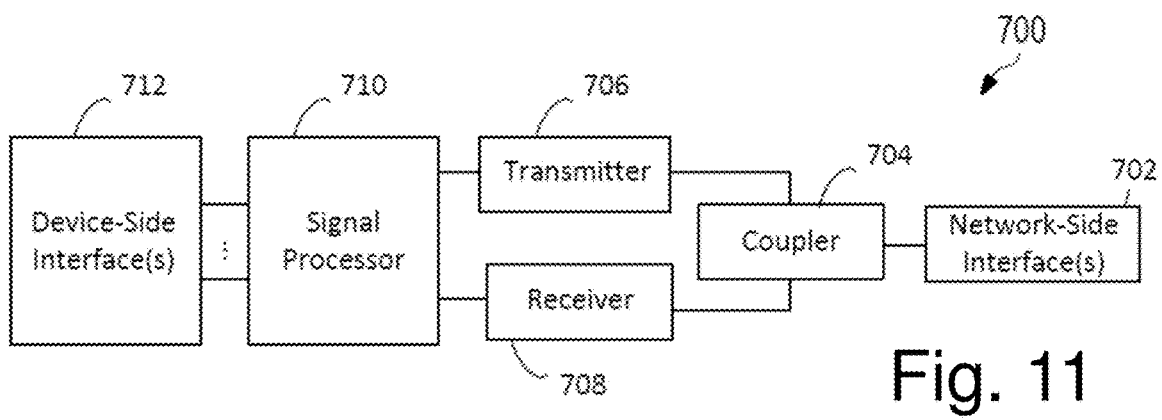
FIG. 11 illustrates a transceiver.

In some embodiments, one or more of the interfaces 610, 612, 614 connects the processing system 600 to a transceiver adapted to transmit and receive signaling over the telecommunications network. FIG. 11 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), Sub-1 GHz RF, etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, Power Line, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by, e.g., a configuration unit/module. The respective units/modules may be hardware, software, or a combination thereof. For instance, one or more of the units/modules may be an integrated circuit, such as field programmable gate arrays (FPGAs) or application-specific integrated circuits (ASICs).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

For example, according to a first aspect a method comprises receiving, by an agent device, from a first device, a bootstrap request message over a first communication channel; transmitting, by the agent device, to a coordinating device, a second request message comprising the bootstrap request message and a first channel type indicator indicating a channel type of the first communication channel; receiving, by the agent device, from the coordinating device, a first response message comprising a bootstrap response message and a second channel type indicator indicating the channel type of the first communication channel; and transmitting, by the agent device, to the first device, the bootstrap response message over a second communication channel in accordance with the second channel type indicator.

According to a second aspect depending on the method of the first aspect, the channel type being either a power line communication channel or a radio frequency channel.

According to a third aspect depending on the method of the first aspect, the first communication channel and the second communication channel being a same channel type.

According to a fourth aspect depending on the method of the first aspect, the first channel type indicator being a 1-bit indicator.

According to a fifth aspect depending on the method of the first aspect, the first channel type indicator and the second channel type indicator being the same.

According to a sixth aspect depending on the method of the first aspect, wherein the bootstrap request message comprises a third channel type indicator indicating the channel type of the first communication channel.

According to a seventh aspect depending on the method of the first aspect, wherein the first communication channel comprises a channel from the first device to the agent device and the second communication channel comprises a channel from the agent device to the first device.

According to an eighth aspect, an agent device comprises a memory storing a program; and a processor configured to execute the program, the program comprising instructions that when executed by the processor, is configured to perform the method of any one of the first to seventh aspects.

According to a ninth aspect a method comprises receiving, by an agent device, from a first device, a bootstrap request message over a first communication channel; transmitting, by the agent device, to a coordinating device, a second request message comprising the bootstrap request message and an address of the first device; storing, by the agent device, the address of the first device and a channel type of the first communication channel; receiving, by the agent device, from the coordinating device, a first response message comprising a bootstrap response message and the address of the first device; identifying, by the agent device, a second communication channel in accordance with the channel type of the first communication channel associated with the address of the first device; and transmitting, by the agent device, to the first device, the bootstrap response message over the second communication channel.

According to a tenth aspect depending on the method of the ninth aspect, the channel type being either a power line communication channel or a radio frequency channel.

According to an eleventh aspect depending on the method of the ninth aspect, the first communication channel and the second communication channel being the same channel type.

According to a twelfth eleventh aspect depending on the method of the ninth aspect, the address of the device and the channel type of the first communication channel are stored in a memory of the agent device.

According to a thirteenth aspect depending on the method of the ninth aspect, the channel type of the first communication channel being a 1-bit indicator.

According to a fourteenth aspect, an agent device comprises a memory storing a program; and a processor configured to execute the program, the program comprising instructions that when executed by the processor, is configured to perform the method of any one of claims 9-13.

According to a fifteenth aspect a method comprises receiving, by an agent device, from a device, a bootstrap request message over a first communication channel; transmitting, by the agent device, to a coordinating device, a request message comprising the bootstrap request message and an address of the device; receiving, by the agent device, from the coordinating device, a response message comprising a bootstrap response message and the address of the device; and transmitting, by the agent device, to the device, the response message over a plurality of communication channels, the plurality of communication channels comprising different channel types of communication channels between the agent device and the device.

According to a sixteenth aspect depending on the method of the fifteenth aspect, the channel types comprising at least a power line communication (PLC) channel type and a radio frequency (RF) channel type.

According to a seventeenth aspect depending on the method of the fifteenth aspect, the plurality of communication channels comprising at least one communication channel of each channel type.

According to an eighteenth aspect, an agent device comprises a memory storing a program; and a processor configured to execute the program, the program comprising instructions that when executed by the processor, is configured to perform the method of any one of the fifteenth to seventeenth aspects.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method comprising:
receiving, by an agent device, from a first device, a bootstrap request message over a first communication channel;
transmitting, by the agent device, to a coordinating device, a second request message comprising the boot- strap request message and a first channel type indicator indicating a channel type of the first communication channel;

receiving, by the agent device, from the coordinating device, a first response message comprising a bootstrap response message and a second channel type indicator indicating the channel type of the first communication channel; and transmitting, by the agent device, to the first device, the bootstrap response message over a second communication channel in accordance with the second channel type indicator.

2. The method of claim 1, the channel type being either a power line communication channel or a radio frequency channel.

3. The method of claim 1, the first communication channel and the second communication channel being a same channel type.

4. The method of claim 1, the first channel type indicator being a 1-bit indicator.

5. The method of claim 1, the first channel type indicator and the second channel type indicator being the same.

6. The method of claim 1, wherein the bootstrap request message comprises a third channel type indicator indicating the channel type of the first communication channel.

7. The method of claim 1, wherein the first communication channel comprises a channel from the first device to the agent device and the second communication channel comprises a channel from the agent device to the first device.

8. An agent device comprising:
a memory storing a program; and
a processor configured to execute the program, the program comprising instructions that when executed by the processor, is configured to perform:
receiving, from a first device, a bootstrap request message over a first communication channel;
transmitting, to a coordinating device, a second request message comprising the bootstrap request message and a first channel type indicator indicating a channel type of the first communication channel;
receiving, from the coordinating device, a first response message comprising a bootstrap response message and a second channel type indicator indicating the channel type of the first communication channel; and
transmitting, to the first device, the bootstrap response message over a second communication channel in accordance with the second channel type indicator.

9. The agent device of claim 8, wherein the channel type is either a power line communication channel or a radio frequency channel.

10. The agent device of claim 8, wherein the first communication channel and the second communication channel are a same channel type.

11. The agent device of claim 8, wherein the first channel type indicator is a 1-bit indicator.

12. The agent device of claim 8, wherein the first channel type indicator and the second channel type indicator are the same.

13. The agent device of claim 8, wherein the bootstrap request message comprises a third channel type indicator indicating the channel type of the first communication channel.

14. The agent device of claim 8, wherein the first communication channel comprises a channel from the first device to the agent device and the second communication channel comprises a channel from the agent device to the first device.

15. A method comprising:
receiving, by an agent device, from a first device, a bootstrap request message over a first communication channel;
transmitting, by the agent device, to a coordinating device, a second request message comprising the bootstrap request message and an address of the first device;
storing, by the agent device, the address of the first device and a channel type of the first communication channel;
receiving, by the agent device, from the coordinating device, a first response message comprising a bootstrap response message and the address of the first device;
identifying, by the agent device, a second communication channel in accordance with the channel type of the first communication channel associated with the address of the first device; and
transmitting, by the agent device, to the first device, the bootstrap response message over the second communication channel.

16. The method of claim 15, the channel type being either a power line communication channel or a radio frequency channel.

17. The method of claim 15, the first communication channel and the second communication channel being the same channel type.

18. The method of claim 15, the address of the first device and the channel type of the first communication channel being stored in a memory of the agent device.

19. The method of claim 15, the channel type of the first communication channel being a 1-bit indicator.

20. The method of claim 15, wherein the first communication channel comprises a channel from the first device to the agent device and the second communication channel comprises a channel from the agent device to the first device.

* * * * *